Feb. 6, 1923.
A. L. McGREGOR.
AUTOMOBILE BUMPER.
FILED MAR. 24, 1920.
1,443,960
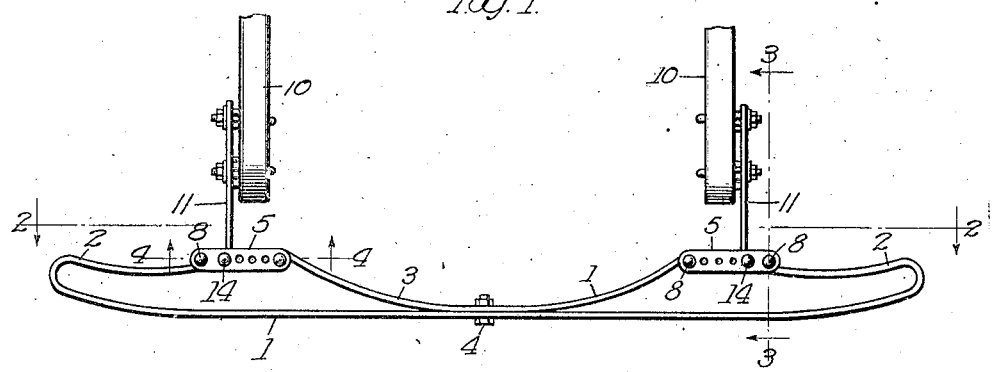
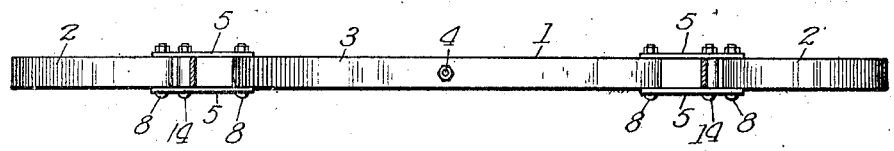
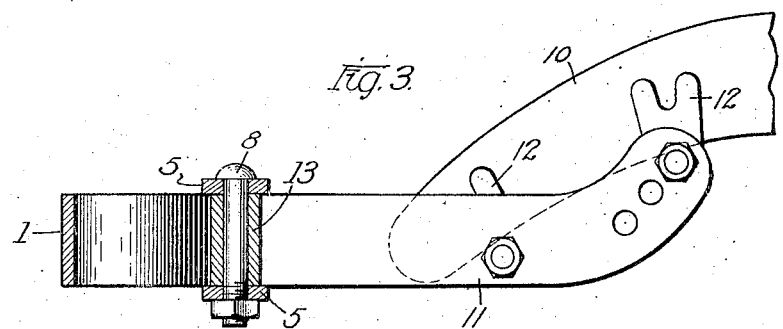
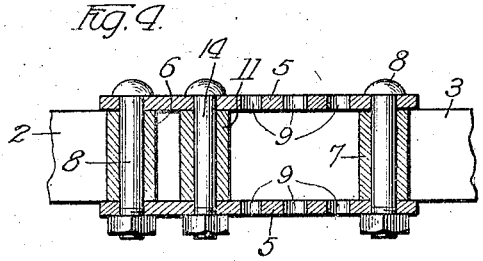
Inventor
Allan L. McGregor Patented Feb. 6, 1923.

1,443,960

UNITED STATES PATENT OFFICE.

ALLAN L. McGREGOR, OF CHICAGO, ILLINOIS.

AUTOMOBILE BUMPER.

Application filed March 24, 1920. Serial No. 368,458.

*To all whom it may concern:*

Be it known that I, ALLAN L. MCGREGOR, a citizen of the United States, and a resident of Chicago, in the county of Cook and State of Illinois, have invented certain new and useful Improvements in Automobile Bumpers, of which the following is a specification.

This invention relates to improvements in automobile bumpers and more particularly to devices of the character described which are adapted for attachment to the front end of motor vehicles for the purpose of protecting the vehicle from collision with other vehicles or objects with which the vehicle may accidentally collide.

The object of this invention is to provide a construction for a bumper in which a greater degree of strength is afforded, and more especially to provide a construction which will render the bumper capable of resisting the effects of impact without permanent distortion of the bumper itself. A further object of the invention is to provide a bumper structure whereby the impact may be uniformly distributed throughout the bumper, by including an equalizing member. A further feature of the construction is the introduction of an adjustable connection between the bumper and the vehicle in order to provide for various distances between the frame members of the vehicle, to which the bumper is attached.

The features embodied in the invention are hereinafter more fully set forth and in connection with the accompanying drawings in which Fig. 1 is a top plan view of the bumper as attached to the vehicle frame member, Fig. 2 is a view in rear elevation, as taken on line 2, 2, of Fig. 1, Fig. 3 is an enlarged detail view as taken on line 3, 3 of Fig. 1.

Fig. 4 is an enlarged sectional view taken on line 4, 4 of Fig. 1.

A preferred form of the bumper comprises in general an impact section consisting herein of a main impact bar 1 formed of a bar of resilient metal, said bar being a flat plate of the vehicle-spring type having a width considerably exceeding the thickness thereof, the bar being arranged so that the faces of the bar lie in a vertical plane and form the impact surface. The end portions 2, 2 of the bar 1 are bent rearwardly inwardly to form U-shaped end portions terminating at equal distances inwardly from the extremities of the bar. Connected to the central portion of the impact bar 1 and engaging the rearward vertical face thereof is a bar 3 of curvilinear form, said bar being also of the spring-plate type. This bar constitutes the supplemental section of the bumper and is rigidly connected to the impact section bar 1 by means of a nut and bolt connection 4, said bar extending laterally and rearwardly from the central point of connection, its free ends terminating in alinement with the free ends of the end portions 2, 2 of the impact bar 1 and offset inwardly a short distance from the respective free ends. Connecting the free ends of the impact bar with the adjacent ends of the curved bar 3 are pairs of links 5, 5, these pairs of links being identical in formation and are located above and below the connected end portions of the bars 1 and 3. The pairs of links are pivotally connected to the extremities of the bars 1 and 3 by the provision of eyes 6 and 7 formed at the ends of said bars 1 and 3, respectively, and bolts 8 extending through holes formed at the ends of the links and passing through the eyes 6 and 7. Formed in the pairs of links 5, 5 and arranged longitudinally thereof, are series of holes 9 arranged in registering pairs, said holes serving the following purpose: The bumper structure consisting of the bar 1, the curved bar 3, and the pairs of links 5, 5, is attached to the forward ends of the vehicle frame members 10, 10 by means of short connecting bars 11, 11 extending parallel to the frame members 10, 10 and at right angles to the links 5, 5. The connecting bars 11, 11 are attached at their rear ends to the vehicle frame members 10 by means of suitable connecting bolts 12, 12 serving for removably clamping the complete bumper to the vehicle. The forward end of each connecting bar 11 is provided with a round eye 13 adapted to extend between the vertically spaced links 5, 5 and to register with one of the pairs of holes 9, 9 formed in said links. The particular holes 9, 9 of the links 5, 5, with which the connecting bars 11, 11 would register, would depend on the distance separating the connecting bars 11, 11, which distance in turn would depend upon the distance between the parallel frame members 10, 10 of the vehicle. By the provision of several pairs of holes 9, 9 arranged longitudinally of the links 5, 5, and likewise longitudinally of the bumper, it is thus possible to apply or fit the bumper bar to different makes of vehicles, which vary as to the distance between the frame members 10, 10. Bolts 14, 14 are inserted through the eyes 13, 13 at the ends of the connecting bars 11, 11, and through the desired pair of registering holes 9, 9 in the links 5, 5.

In a structure such as hereinbefore described the links 5, 5, have pivoted connection at their ends with the free ends of the main impact bar 1 and the adjacent free ends of the curved bar 3 which constitutes the supplemental section and which may be called a reinforcing or equalizing bar. Likewise, these links have pivotal connection intermediate their ends with their connecting bars 11, 11, hence the latter points of connection act as fulcrums for any relative movement between the bars 1 and 3. When the vehicle collides with an object and the impact is received by the bar 1, the structure of the bumper is such that the shock is transmitted uniformly to all parts of the structure through the medium of the equalizing bar 3, the links 5, 5, and the pivots 8. For instance, if the impact is received near the end of the impact bar, a certain distortion of the bar follows which transmits certain stresses throughout all portions thereof. By reason of the presence of the reinforcing bar 3 and the pivoted link connection between the ends of the bars, the different members are free to be distorted without danger of becoming permanently bent out of shape, but will on the other hand be immediately brought back to their normal positions by the action of the equalizing bar 3. Similarly, if the vehicle is moving in a backward direction and the ends of the bumper should accidentally engage an obstacle, the bumper has sufficient resiliency or flexibility to permit considerable distortion without breakage, and immediately upon being released, the parts will resume their normal position through the spring action in the equalizing bar and the free movement permitted by the links 5, 5.

The features of my invention are hereinafter more specifically set forth in the appended claims.

I claim as my invention:

1. In an automobile bumper, the combination of an impact bar, having its end portions bent in U-form, links connected with the free ends of said bar, and a resilient member connecting the free ends of said links.

2. In an automobile bumper, the combination of an impact bar having its end portions bent into U-form, links pivotally connected with the free ends of said bar, and a resilient member joining the free ends of said links with said bar intermediate its ends.

3. In an automobile bumper, the combination of an impact bar having U-shaped end portions, links pivotally connected with the ends of said bar, a resilient bar pivotally connected at its ends to the free ends of said links, and rigidly connected to said impact bar intermediate its ends.

4. In an automobile bumper, the combination of a resilient impact bar terminating in U-shaped end portions, links pivotally connected to the free ends of said bar, a resilient bar connecting the free ends of said links and rigidly connected with the bar intermediate its ends.

5. In an automobile bumper, the combination of a resilient impact bar terminating in U-shaped end portions, links connected to the free ends of said bar, a resilient member connecting the free ends of the links with the central portion of the impact bar, and attaching members pivotally connected to the links intermediate their ends.

6. In an automobile bumper, the combination of an impact bar comprising two rearwardly spaced end portions, a resilient member extending between the ends of said end sections, links inserted in the rearmost portion between the adjacent ends of said end portions and resilient members, and located adjacent the point of attachment, attaching members, and means for connecting said attaching members at a plurality of positions intermediate the ends of said links.

7. In an automobile bumper, the combination of a resilient impact bar, comprising horizontally spaced end portions and an equalizing bar rigidly fixed to the central portion of said bar, and terminating adjacent the free ends thereof, links connecting the free ends of the bar, and said equalizing bar and attaching members, adapted to be adjustably connected with said links.

8. A vehicle bumper comprising a resilient impact section and a continuous resilient supplemental section pivotally connected at their ends, the central portion of the supplemental section being connected to the central portion of the impact section.

9. A vehicle bumper comprising a resilient impact section having its ends formed into loops, the ends of said section being presented toward each other and a resilient continuous supplemental section connected at its ends to the ends of the impact section and having its central portion connected to the central portion of said impact section.

10. A vehicle bumper comprising a resilient impact section and a supplemental section comprising a plate, said sections being connected at their ends, the central portion of the supplemental section being connected to the central portion of the impact section, and means for pivotally supporting said bumper from a vehicle frame.

11. A vehicle bumper comprising a resilient impact section having its ends formed into open loops and a supplemental section comprising a plate having its ends pivotally connected to the ends of the impact section and having its central portion projected toward and connected to the central portion of the impact section.

12. A vehicle bumper comprising a resilient impact section and a supplemental section comprising a plate, said sections having their ends connected, the central portion of the supplemental section being arranged to reinforce the central portion of the impact section upon deflection of such impact section, and means for pivotally supporting said bumper from a vehicle frame.

13. A vehicle bumper comprising a resilient impact section and a continuous resilient supplemental section having their ends pivotally connected, the central portion of the supplemental section being arranged to reinforce the central portion of the impact section upon deflection of such impact section toward such supplemental section.

14. A vehicle bumper comprising a resilient impact section having its ends formed into loops, the ends of said section being presented toward each other, and an auxiliary section comprising a plate projected toward and secured at its central portion to the central portion of the impact section and having its ends connected to the ends of the impact section.

15. The combination, with a vehicle and supporting members carried thereby, of a bumper comprising a resilient impact section comprising a plate having looped ends and an auxiliary section having its ends pivotally connected to such looped ends and its central portion projected toward and connected to the central portion of said impact section, and means pivotally supporting said bumper from said supporting members.

16. The combination, with a vehicle and supporting members carried thereby, of a bumper comprising a resilient impact section and a continuous resilient supplemental section connected at its ends and at its central portion to the impact section, and arms pivotally supporting said bumper from the said supporting members.

17. The combination, with a vehicle and supporting members carried thereby, of a bumper comprising a resilient impact section comprising a plate having looped ends and a supplemental section connected at its ends to such looped ends and at its central portion to the central portion of said impact section, and means pivotally supporting said bumper from said supporting members.

18. The combination, with a vehicle and supporting members carried thereby, of a bumper comprising a resilient impact section and a continuous resilient supplemental section having its ends and its central portion connected to the ends and the central portion of the impact section, and means pivotally supporting said bumper from said supporting members.

19. The combination, with a vehicle and supporting members carried thereby, of a bumper comprising a yieldable impact section, and a supplemental section comprising a continuous resilient plate connected at its ends to the ends of the impact section and having its central portion projected toward and connected to the central portion of the impact section, and means, permitting relative movement between the bumper and the supporting members and in the direction of the length of the bumper, for connecting the said bumper to said supporting members.

20. A vehicle bumper comprising a resilient impact section having its ends formed into loops, and a supplemental section comprising a continuous resilient plate connected at its ends to the ends of the impact section and having its central portion connected to the central portion of said impact section, and means, adjustable in the direction of the length of the bumper, for supporting the same from a vehicle.

In witness whereof, I hereunto subscribe my name this 20th day of March, A. D. 1920.

ALLAN L. McGREGOR.